United States Patent
Bouthillier et al.

(10) Patent No.: US 9,092,289 B2
(45) Date of Patent: Jul. 28, 2015

(54) SYSTEM AND METHOD TO CREATE AND CONTROL A SOFTWARE APPLIANCE

(71) Applicant: Design Net Technical Products, Inc., Smithfield, RI (US)

(72) Inventors: Robert J. Bouthillier, Smithfield, RI (US); Michael Zelina, Smithfield, RI (US)

(73) Assignee: DESIGN NET TECHNICAL PRODUCTS, INC., Smithfield, RI (US)

( * ) Notice: Subject to any disclaimer, the term of this patent is extended or adjusted under 35 U.S.C. 154(b) by 217 days.

(21) Appl. No.: 13/834,373

(22) Filed: Mar. 15, 2013

(65) Prior Publication Data

US 2014/0196023 A1    Jul. 10, 2014

Related U.S. Application Data

(60) Provisional application No. 61/749,007, filed on Jan. 4, 2013.

(51) Int. Cl.
*G06F 9/45* (2006.01)
*G06F 9/445* (2006.01)

(52) U.S. Cl.
CPC .............. *G06F 8/61* (2013.01); *G06F 2201/00* (2013.01)

(58) Field of Classification Search
CPC .. G06F 8/61; G08C 2201/00; G08C 2201/20; G08C 2201/40; G08C 2201/92; G08C 2201/93
USPC ........................................................ 717/178
See application file for complete search history.

(56) References Cited

U.S. PATENT DOCUMENTS

| | | | | |
|---|---|---|---|---|
| 6,133,847 | A * | 10/2000 | Yang | 340/12.25 |
| 6,826,581 | B2 * | 11/2004 | Moslander et al. | 717/178 |
| 7,725,912 | B2 | 5/2010 | Margulis | |
| 8,527,614 | B2 * | 9/2013 | Vulugundam | 709/221 |
| 8,700,804 | B1 * | 4/2014 | Meyers et al. | 709/248 |
| 2006/0031400 | A1 * | 2/2006 | Yuh et al. | 709/218 |
| 2007/0106570 | A1 | 5/2007 | Hartman et al. | |
| 2009/0222808 | A1 * | 9/2009 | Faus et al. | 717/171 |
| 2009/0249279 | A1 * | 10/2009 | Bourdon | 717/101 |
| 2009/0328077 | A1 * | 12/2009 | Kashyap | 719/328 |
| 2010/0005461 | A1 * | 1/2010 | Shribman et al. | 717/177 |

(Continued)

FOREIGN PATENT DOCUMENTS

EP        2306692 A1      4/2011

OTHER PUBLICATIONS

Fox et al., "Integrating Information Appliances into an Interactive Workspace," IEEE, 2000, 12pg.*

(Continued)

*Primary Examiner* — Ryan Coyer
(74) *Attorney, Agent, or Firm* — Barlow, Josephs & Holmes, Ltd.

(57) ABSTRACT

A system and Method to create and control a software appliance across a wired or wireless connection, such method allowing users to select and store app packages containing control apps and Appliance apps the latter of which are deployed and launched on a selected Software Appliance. The resulting approach provides for improved personalization of the App experience when deployed between a mobile device and a Software Appliance that is installed on a device that is traditionally a shared resource such as a Television.

46 Claims, 12 Drawing Sheets

(56) References Cited

U.S. PATENT DOCUMENTS

| | | | |
|---|---|---|---|
| 2010/0332617 A1* | 12/2010 | Goodwin et al. | 709/219 |
| 2011/0081860 A1 | 4/2011 | Brown et al. | |
| 2012/0200400 A1* | 8/2012 | Arling et al. | 340/12.28 |
| 2012/0287022 A1 | 11/2012 | Queen | |
| 2012/0295662 A1* | 11/2012 | Haubrich | 455/556.1 |
| 2013/0152135 A1* | 6/2013 | Hong et al. | 725/51 |
| 2014/0096128 A1* | 4/2014 | Pohlmann | 717/176 |

OTHER PUBLICATIONS

Tompros et al., "Enabling Applicability of Energy Saving Applications on Appliances of the Home Environment," IEEE, 2009, 9pg.*

* cited by examiner

SYSTEM AND METHOD TO CREATE AND CONTROL A SOFTWARE APPLIANCE

CROSS REFERENCE TO RELATED APPLICATIONS

This application is related to and claims priority from earlier filed provisional patent application Ser. No. 61/749,007, filed Jan. 4, 2013, the entire contents thereof is incorporated herein by reference.

BACKGROUND OF THE INVENTION

Manufacturers of products or Platforms such as automobiles and televisions often have memory limitations that required them to choose only selected Apps to include on their products. While internet access may permit them to alter these selections from time to time, the space limitation remains a factor. The popularity of apps also changes over time and as a result, there is an ever-changing selection of apps which results in tremendous inconsistency in capabilities throughout the evolution of a product family.

Some manufacturers have tried to solve this problem by providing more memory to accommodate more apps while others allow users to add apps to a product, but these approaches further clutter the user-interfaces of products that are shared by family members and all fall short of a providing a personalized solution that is tailored to an individual user.

Our invention can coexist with the traditional approaches described above, and it also provides a new "back-door" connection between a personal mobile device and the target App Platform or player device. This connection provides a means to upload a desired App from the mobile device to the App Platform, to launch this App on the Platform, and then to control the App from the mobile device or from the Platform's supplied remote controls. This connection also provides a means to add Apps that provide access to live events on the target App Platform or player device, including the ticketing, viewing and purchasing of items related to the event.

BRIEF SUMMARY OF THE INVENTION

A system and method to create and control a software appliance across a wired or wireless connection, such method allowing users to select and store app-packages containing control apps and Appliance apps the latter of which are deployed and launched on a selected Software Appliance.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE INVENTION

Overview

The ApNetix System operates by first pairing a mobile device running the ApNetix App Manager with a Playback Device running the ApNetix Software Appliance. Upon opening an ApNetix mobile device app, the Mobile App Manager launches the mobile device app, then transfers an Appliance App to the Software Appliance on the Playback Device, and finally, the Software Appliance launches the Appliance app on the Playback Device. The mobile device App may then be used to control the Appliance App, the Mobile App Manager may exchange history and status information with the Software Appliance, and the Software Appliance may recognize control input from the Playback Device remote control(s). This combination of capabilities, provided by the ApNetix Application Programming Interface (API), results in a powerful system that may be used to launch a wide variety of apps from the mobile device to ApNetix-enabled Televisions and other ApNetix-enabled playback devices.

Due to the portable and flexible nature of the ApNetix architecture, most any computing/processor-equipped device may run either the mobile or the playback application programs, so the roles of mobile device and playback device may in fact be performed by anything from a desktop computer or a tablet computing device to a mobile phone or a mobile media player.

Typical Use Example

Figure 1:
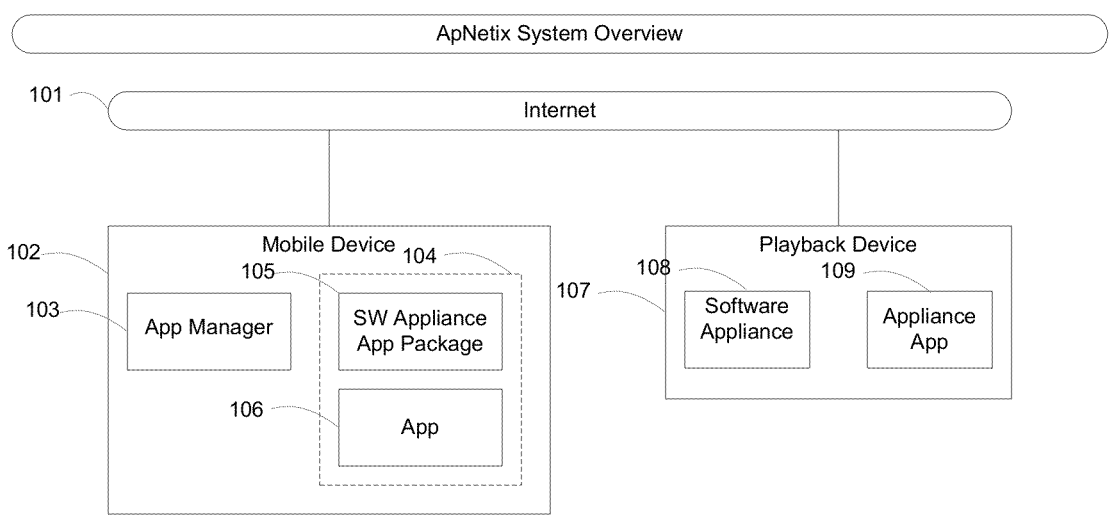
FIG. 1 shows an overview of the ApNetix System.
Figure 2:
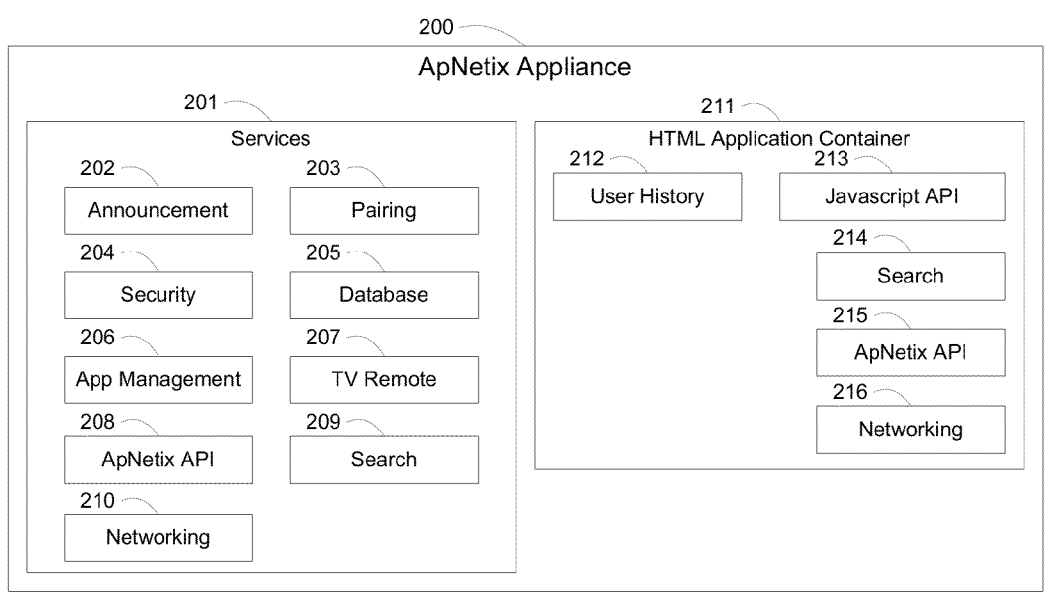
FIG. 2 illustrates the capabilities of the Services and HTML Application Container on the ApNetix Appliance.
Figure 3:
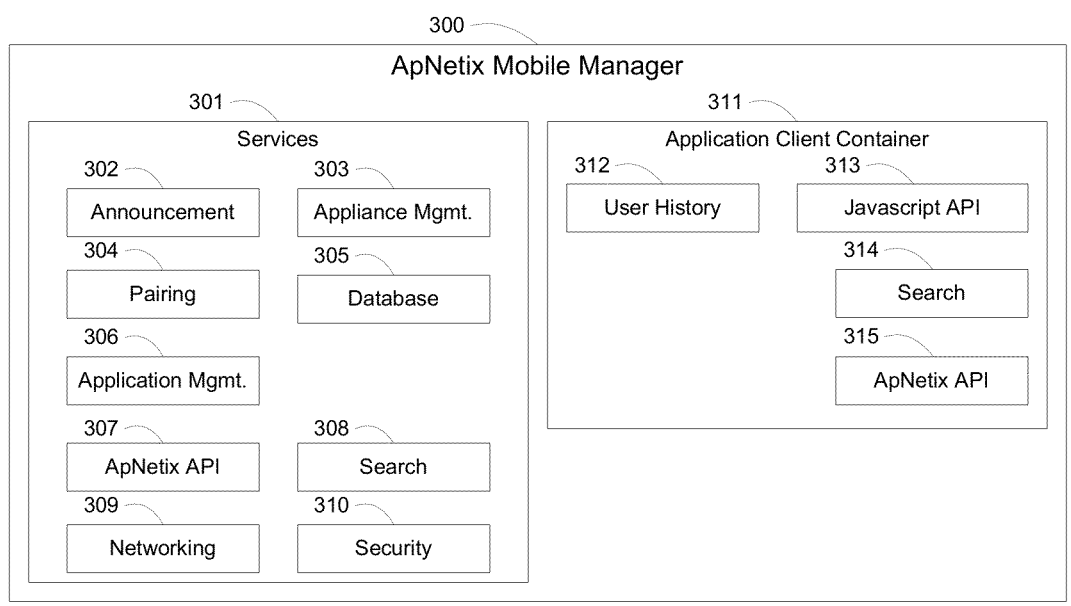
FIG. 3 illustrates the capabilities of the Services and Application Client Container on the ApNetix Mobile Manager.
Figure 4:
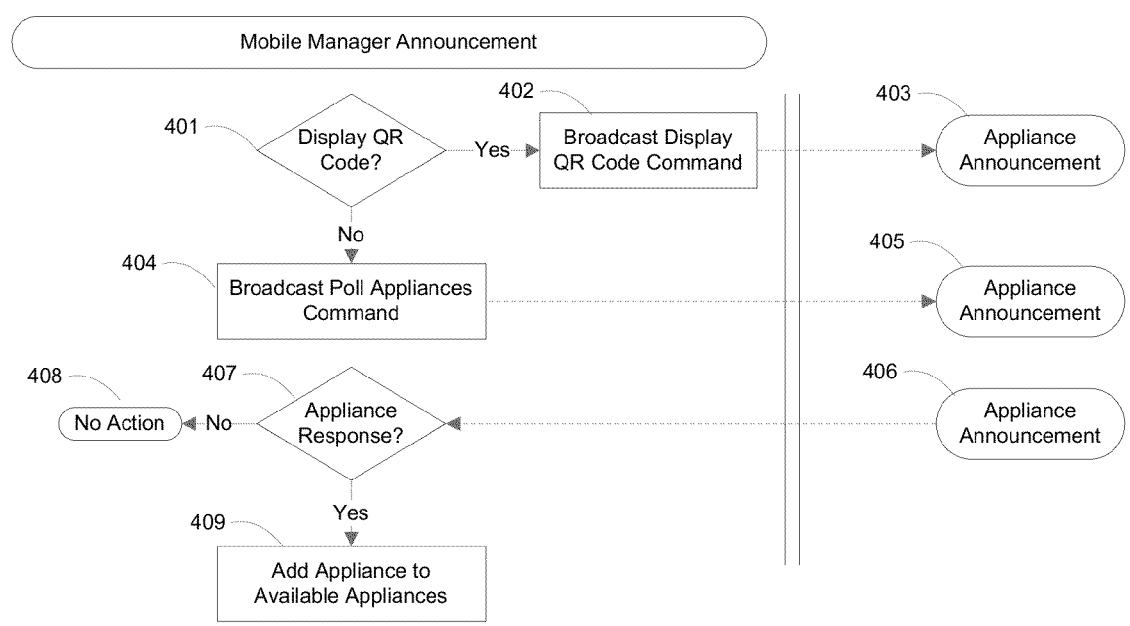
FIG. 4 illustrates Mobile Manager Announcement, which is launched when the user launches the Mobile Manager.
Figure 5:
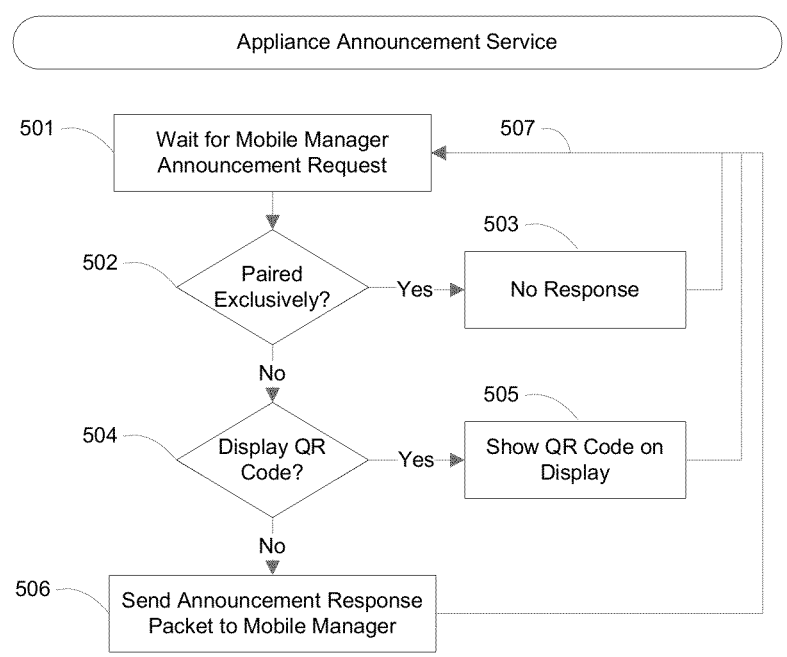
FIG. 5 illustrates the Appliance Announcement Service, which listens for Mobile Managers on the network.
Figure 6:
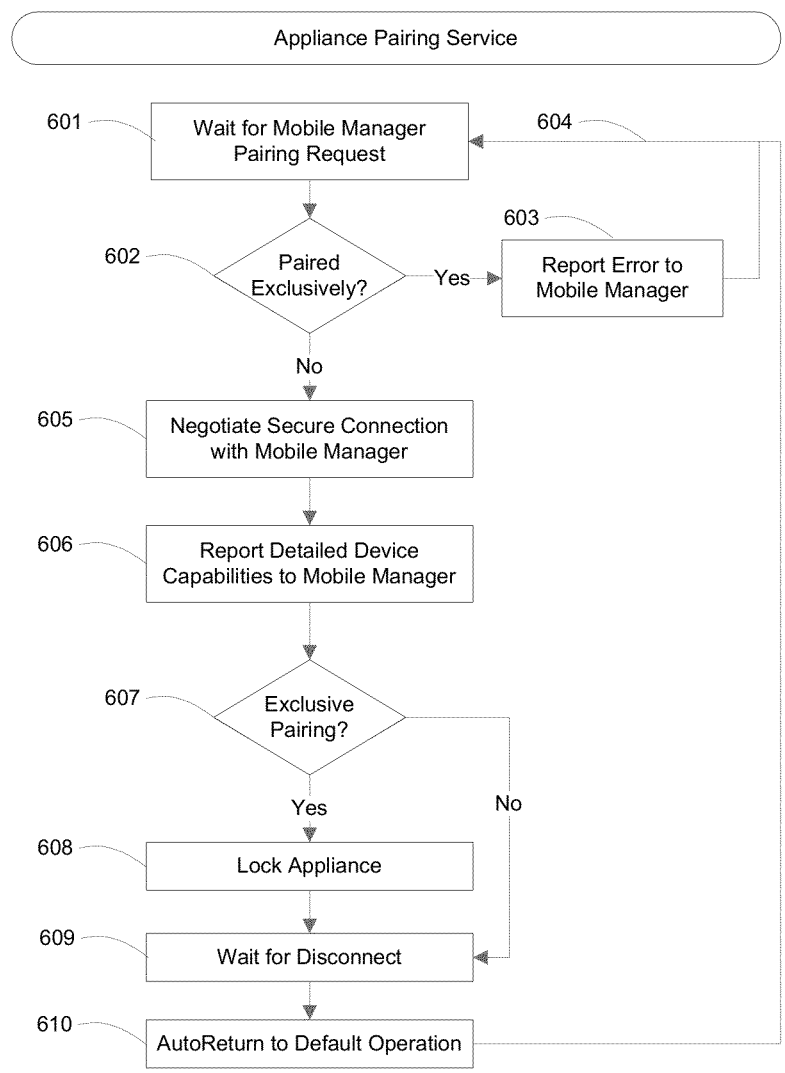
FIG. 6 illustrates the Appliance Pairing Service, which is initiated when the Appliance receives a pairing request.
Figure 7:
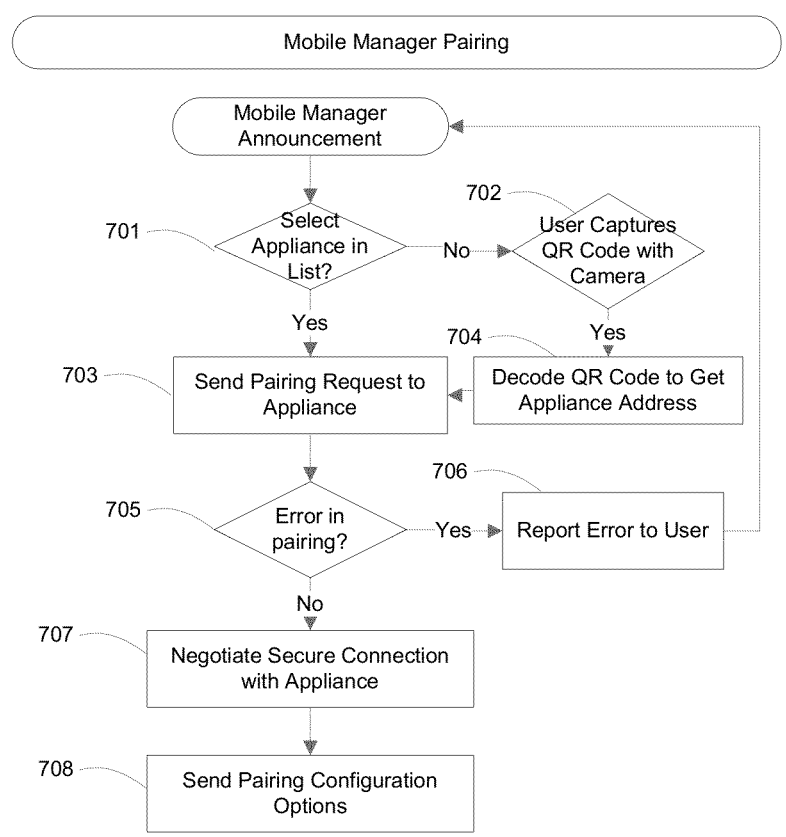
FIG. 7 illustrates Mobile Manager Pairing.
Figure 8:
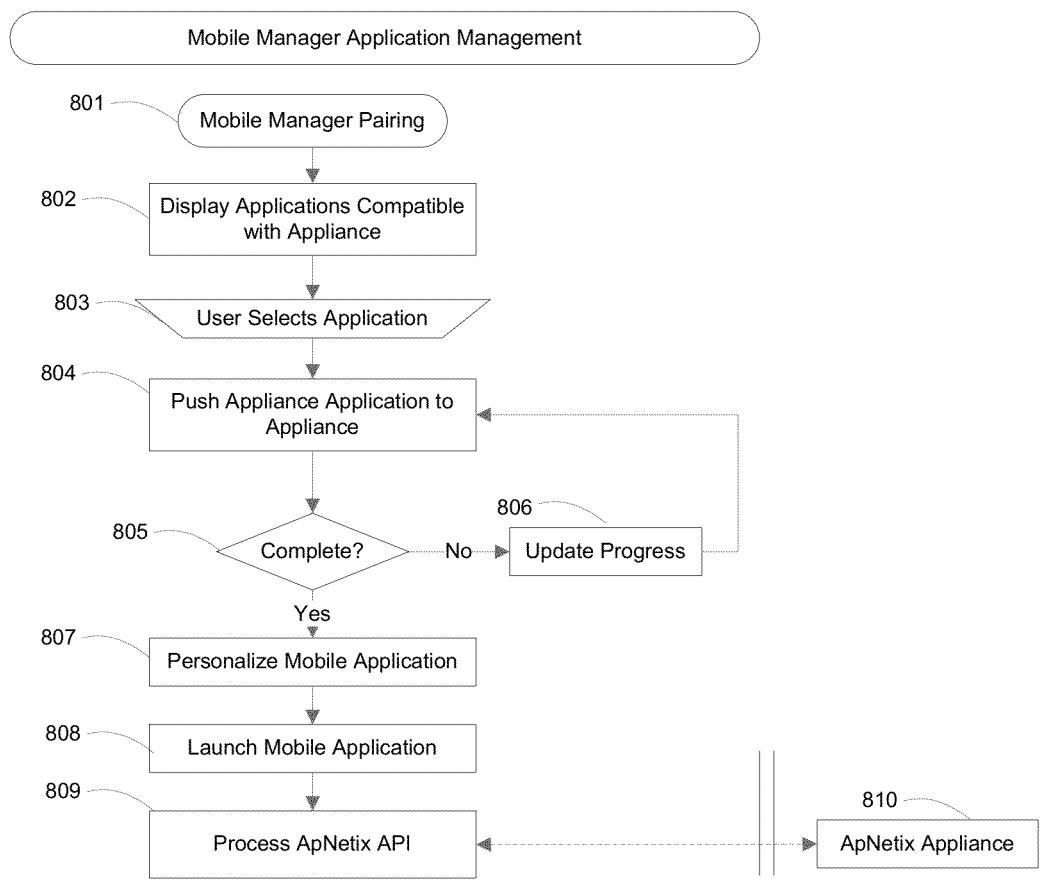
FIG. 8 illustrates Mobile Manager Application Management, which allows the user to select apps to personalize their device.
Figure 9:
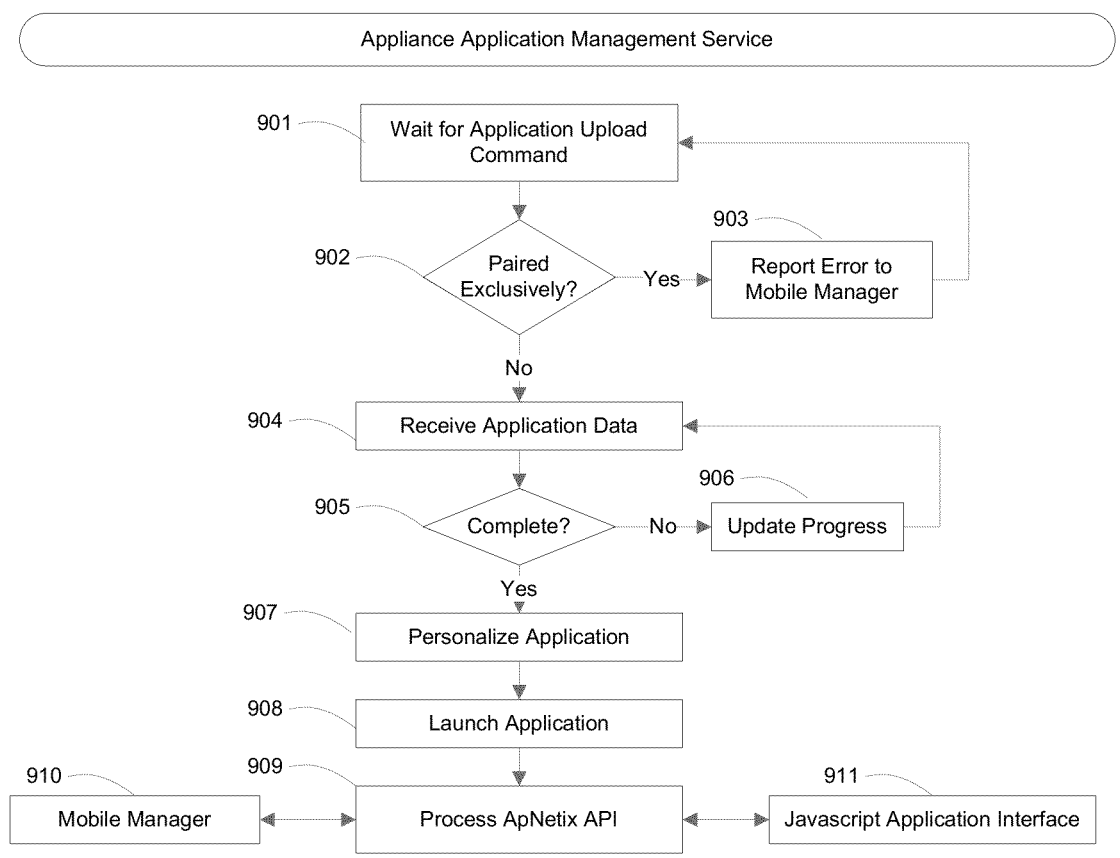
FIG. 9 illustrates the Appliance Application Management Service.
Figure 10:
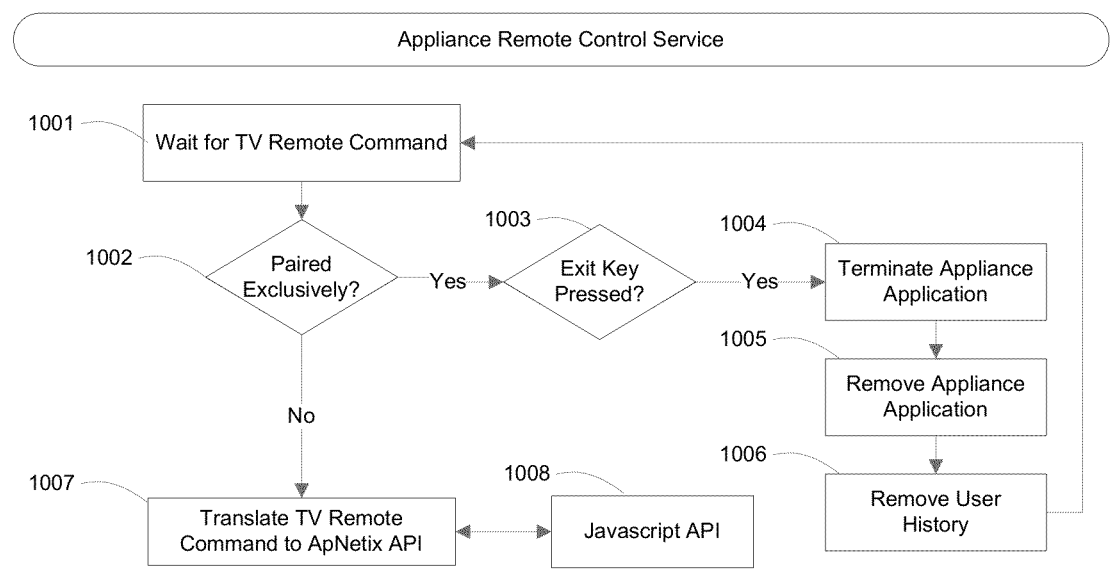
FIG. 10 illustrates the Appliance Remote Control Service, which provides an interface to control the ApNetix Appliance from a remote control.
Figure 11:
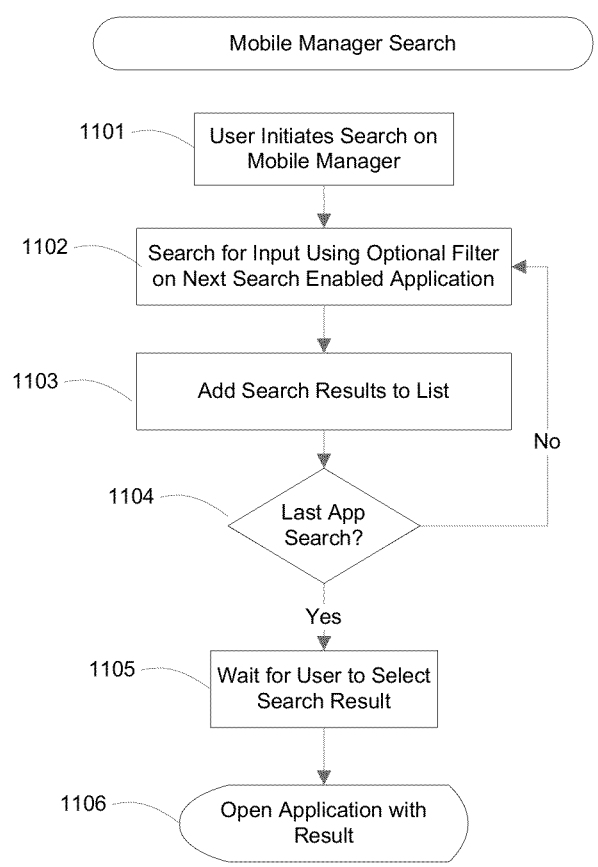
FIG. 11 illustrates Mobile Manager Search, which is capable of searching for content across multiple ApNetix Applications.
Figure 12:
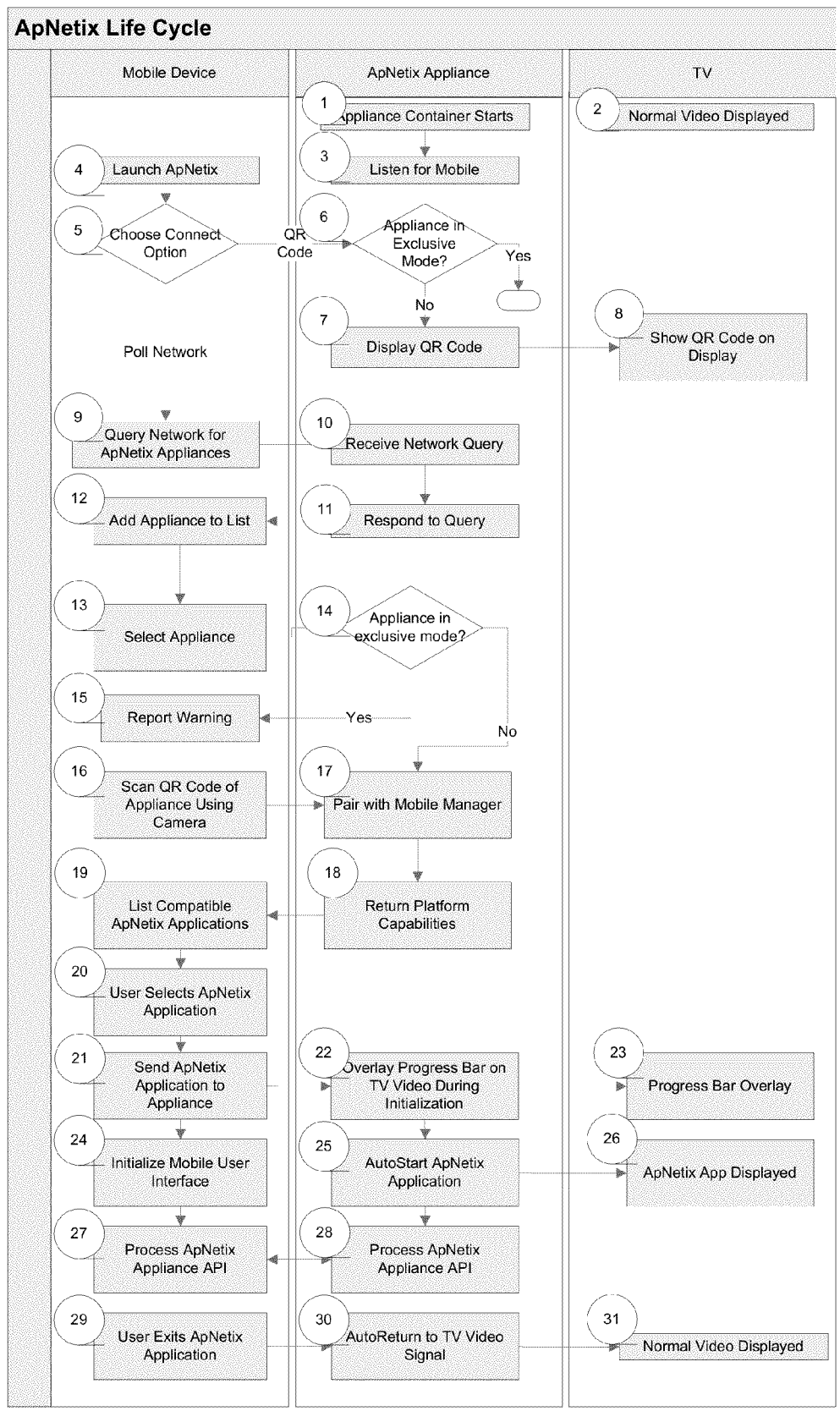
FIG. 12 illustrates an example of a typical ApNetix life cycle. This example assumes that a mobile device is being used to control and launch the ApNetix App and that a television set is running the ApNetix Software Appliance to deliver the Appliance App to the user.

A typical ApNetix Life Cycle is outlined in FIG. 12. This assumes that the ApNetix Appliance and Mobile Device are on the same wired or wireless network. It further assumes that a mobile device is being used to control and launch the ApNetix App, and that a Television set with ApNetix capability is running the ApNetix Software Appliance to deliver the Appliance App to the user. The example beings with Step (1) when the ApNetix Software Appliance (2) is booted during the TV set power-up sequence and the Appliance "Container" becomes available to listen for mobile devices (3) wanting to pair with it. The first user interaction begins with the User selecting an ApNetix Appliance on the network (4) on his mobile device, then selecting (5) an application compatible with the ApNetix Appliance. This leads to the Appliance App being presented to the user (26) on their TV.

Note that ApNetix devices may also be linked by other means including Bluetooth, USB, Firewire or by other means that are familiar to those trained in the art.

Software Appliance

An ApNetix Software Appliance is an operating environment or a software platform to allow native Apps or ApNetix Apps to be loaded on ApNetix-enabled televisions, projectors, computers, tablets, automobiles, exercise machines and more. These devices are essentially computing devices with RAM, an OS and storage, which act as a host to the ApNetix Software Appliance.

The ApNetix Software Appliance, also known as the ApNetix Appliance or the Appliance, also allows most web-enabled apps to run on enabled host devices (TV, DVR, Projector, Computer, etc.) and it provides an API allowing connectivity to the host-device internet connection and its remote control device as well as connectivity using smartphones, computers or tablets.

An ApNetix Appliance must be installed onto the computer or display device by the manufacturer or the user. Once installed, the user may use their smartphone, tablet or other computing device to connect to their Appliance-enabled device and launch a desired app.

The ApNetix Software Appliance must be launched to enable its services to be available. During the ApNetix Appliance (100) boot process, the ApNetix Appliance services are started (101). Its services include Announcement (202) where the Appliance responds to a discovery inquiry on the network, Pairing (203) which permits a user to complete a public or private session with the Appliance, Security (204) which manages the access-control rights for the session, Database (205) which supports the dynamic exchange of history information between the Application User History (212) and the Mobile App Manager Database (305), App Management (206) which launches apps which conform to the EULA and provides interfaces to the Mobile App Manager and to the interface for the Playback Device Remote Controls (207), ApNetix API (208) which provides the interfaces used to connect to the Playback Device, including data exchange and event triggering between the Software Appliance and the Appliance App (ticketing, advertisements, targeted ads, etc.), Search (209) which enables the Mobile App Manager to access program information from the Appliance and Networking (210) which provides for connectivity with the Mobile App Manager and for connectivity between the launched Appliance application and its hosting website.

The ApNetix Appliance also provides an HTML Application Container which is the "sandboxed" application environment into which the Software Appliance App Package (105) is launched. This Application Container exposes an ApNetix API (215), a JavaScript API (213), a Networking interface (216), Search interface (214) and a means of exchanging User History information (212) with the Mobile App Manager.

Appliance App

An ApNetix Appliance App is delivered in an App Package that may contain a script or an executable program that is launched by and within an ApNetix Software Appliance HTML Application Container (211). The purpose of the Appliance App is to provide the user with access to one or more services; examples of which include Web-services such as Netflix, Hulu or YouTube; local services which may include photo browsers, music or movie collections; Pay-Per-View content, including live events, such as concerts, comedy shows; educational offerings, such as classes, tutoring, musical instruction and the like; and conferences or presentation tools such as PowerPoint, Photoshop or the like. An Appliance app generally functions independently from the smartphone or tablet from which it was launched, but it maintains connectivity with the original launch-device's Mobile App Manager when that device is available. Appliance apps may also serve in strictly a slave-mode. An example of a slave device is a mobile-screen-mirror app where the mobile device screen is duplicated on the Appliance screen.

Mobile Manager

The Mobile Manager provides a platform of ApNetix services that reside on the mobile or launching host-device. These services are accessed through an API (307) that provide for content-search (308), pairing (304) with a remote Appliance, retaining of history information via the database (305), managing security (310), Appliance management (306) for communications with and control of remote appliances, networking (309) for access to the Appliance and to the Internet for performing updates, content searches (308), announcement (302) and pairing (304). The Mobile Manager resides upon a smartphone or tablet, which has RAM, an OS and flash storage and is executed on the operating system of that type of device.

The mobile manager includes an Application Client Container (311) which provides an operating environment in which the ApNetix services may be delivered to the various ApNetix Apps. This operating environment provides for the exchange of user history information (312) with the Software Appliance, it provides a JavaScript API interface for launching an app, it provides for search (314) within the application's content database, and it exposes a select segment of the ApNetix API (315).

Mobile App Package

An ApNetix Mobile App Package (104) includes a mobile app program (106) plus an Appliance App Package (105). A typical use case would require the user to select an ApNetix Mobile App Package from their mobile-product app store, and downloading and installing the App Package in a familiar fashion. One key difference between this App Package and a traditional app is that this app comes with an embedded ApNetix Appliance Package that will be launched on a linked remote Appliance when the ApNetix App is opened.

Mobile App

An ApNetix Mobile App is delivered in a Mobile App Package and it serves to initiate the launch of a related Appliance App on a linked remote Appliance. As an example of how this works, if a user installed the Netflix ApNetix App on their smartphone, when the Netflix icon is selected, the Netflix Appliance App will be sent to a linked Appliance on the HDTV and Netflix will open. The Mobile app may then behave as a mouse-pad or it may be used to search for content on Netflix and/or across other installed applications, or the mobile screen may carry the same content. The mobile App may also communicate with the Appliance to exchange data including user history, demographics and the like.

Mobile Search

The ApNetix Mobile App is capable of searching for content across all installed ApNetix applications. ApNetix Mobile Search also utilizes a social search feature that locates content based on social feeds a user has linked with their ApNetix account, including Twitter, Facebook and the like. Social search functionality includes searching for content or related content that peers have watched, searching for content or related content that the user has watched, searching based on users or groups that the user follows, searching based on updates, comments or other information that the user has shared or received.

Each search also returns LiveGuide results that are retrieved from the live event database. Live search results may include results geared toward the user, based on user history and social search, as well as events based on time, date or proximity.

Social Sharing

In addition to social search for content and live events, ApNetix also provides social broadcasting. This allows users to share content, services that they are using on their linked social feeds. For example, if a user purchased a ticket to watch a musical concert, the user may share that they purchased a ticket for a concert that is X days away, they may share when it begins and throughout the show they can share concert information, comments, concert memorabilia, CDs, music downloads and the like.

Mobile Integration

The ApNetix Mobile App pushes an App to the television or other appliance directly from a mobile device to initiate the launch of a related Appliance App on a linked remote Appliance. Since the App is always delivered from the mobile device, it will deliver reliable results everywhere, including in schools, businesses or before public audiences. Apps that load via a web link may be blocked on a particular network (schools, businesses, etc.), they may be hacked to produced an undesired result or they may simply deliver an unfamiliar result as a result of updates or changes.

App Developers may choose how the mobile device may be used with the App after the App is launched. Use may include: remote control, with mouse-type functions; Interactive Augmented control, providing additional content related to the content running on the Appliance; screencast, providing the same or similar screen on both the mobile device and the Appliance; and custom use, an App Developer may program desired capability for mobile device after launching the App on the Appliance.

Ticketing

ApNetix live event tickets may be posted by venues and offered for sale. Users may purchase tickets via LiveGuide, direct search on the web or mobile App, venue ticket site, online ticket reseller or ticket reseller location. Ticket payments may be processed by internet service providers or by traditional means, such as credit card, cash and the like. ApNetix offers simplicity by following a self service business model for posting events, sending live streams to users and purchasing tickets.

Announcement

When the user launches the Mobile Manager on the mobile device, the Mobile Manager presents two options for announcing itself on the network—QR Code or other 2D barcode Display or Poll Network.

If the user selects the QR code option (402), the Display QR Code command will be broadcasted to the network (403). If the user selects the Poll Network option (404), an Appliance Announcement command is broadcasted to the network (405). Each appliance that responds to the command is added to a list of available appliances (409) in the mobile manager and may be paired using the unique device name, unique pairing numbers or other available means.

The Announcement service on the Appliance (501) listens for Mobile Managers on the network. The appliance waits until an announcement is received (403, 405). If, when receiving the announcement, the appliance is already exclusively paired, no response will be sent (503). If the appliance is not already paired, the announcement will be processed. The announcement can either request the appliance to display a QR code (505) or just respond with basic appliance information in a packet (506). If a QR code is requested, the appliance will display a QR code on a corner of the display (505). The mobile manager permits a user to use the camera on the mobile device to scan the QR code to identify the network name of the desired display device running the ApNetix Appliance and thus to connect to complete pairing.

If the announcement was an Appliance Announcement command, the appliance sends an Announcement Response packet (506) to the mobile manager.

Pairing

Each appliance that responds (406) to the Mobile Manager announcement (403,405) is added to the appliance list in the Mobile Manager. When the user selects an appliance from this list, the appliance is notified that a Mobile Manager is attempting a connection (601). If the device is non-exclusively paired, the user will be prompted to disconnect the existing connection prior to pairing (609). Pairing can be performed with options such as whether or not to exclusively pair the devices.

During pairing, a secure connection is negotiated (605). After the Mobile Manager and ApNetix appliance are paired, the appliance responds with a detailed list of capabilities (606). The Mobile Manager may use these capabilities to display a list of compatible ApNetix applications.

Once paired, the pairing service waits for a disconnection request (609). Note that a mobile device may remain paired for a fixed time interval which represents the duration of a program or session even if the mobile device is asleep or unavailable—so long as that mobile device has not issued a disconnect command and so long as the time interval has not expired. On disconnect, the appliance window closes and the appliance AutoReturns to the default input signal if AutoReturn capability is supported by the playback device.

App Management

When the user selects an ApNetix application on the Mobile Manager, the Appliance is notified that an application upload is pending. The Appliance is already paired with the Mobile Manager and the Appliance applications available for upload are filtered based on compatibility with the paired appliance type. This ensures that the selected Appliance application is compatible with the target Appliance in the display system. If, during this process, the Appliance becomes unpaired, an error will be reported.

During the upload of the Appliance App (804), both the application and personalization information is uploaded. This is referred to as application data. Progress during the upload is tracked on the appliance and optionally displayed on the appliance output and on the mobile app manager's display. Once the application data is uploaded, the application is personalized (807) based on user preferences and personal history. For security purposes, personalization information is stored in volatile memory only and is not persistent. Once the application is personalized, the appliance invokes AutoStart (25) to immediately run the application without the need to change inputs on the appliance (26). Once the mobile user interface and the application are running, each end of the paired interface processes the bi-directional ApNetix API (27) (28).

When the user closes the ApNetix app (29), AutoReturn is invoked (30) to return the video to the original input (31).

Appliance Remote Control Service

This Remote Control Service provides an interface to control the ApNetix Appliance from a remote control that is compatible with and/or provided by the TV or display device manufacturer. This permits a viewer to use their traditional remote controls to perform available functions such as play/pause/stop/fwd/rew once the ApNetix App has been launched from the viewer's mobile device. This capability may be optionally supported by ApNetix Apps.

This service is always listening for a TV remote command (1001), and if the current session is not exclusively paired (private), then remote commands will be processed and translated (1007) to JavaScript API commands (1008) to permit remote control functions to operate normally.

If, however, the current session in exclusively paired, then the only function recognized is the remote's EXIT function as a means to terminate (1004) an exclusive pairing with a mobile device. Terminating in this manner will remove the Appliance Application (1005) and will remove user history (1006) and end with AutoReturn which closes the App window on the Appliance.

Mobile Manager Search

The Mobile Manager is designed to search across multiple installed ApNetix Applications to retrieve the location of desired content quickly from multiple content providers.

To begin a search, the user initiates the search by keying the desired keywords in the Mobile manager search field (1101). Optional filters (1102) may be selected to improve results before the search is initiated and a results list (1103) begins to form. Searching results are produced as a result of our API calls using database links provided by each ApNetix App provider. Once search results are complete, the user may select the desired result from the list (1105) which will launch the associated application service with a parameter to load the desired program (1106).

Quality of Service

ApNetix offers streaming video with an unparalleled Quality of Service. Live Stream Quality (LSQ) metrics are optimized for perceived stream continuity versus bitrate-errors, dropped frames, and the like. Live Stream Carriers (CDNs) may actively bid to supply the requested stream resolution, format and LSQ at the lowest cost. Content Delivery Networks (CDNs) will offer transcoding services to deliver streams in the various resolutions and formats required by popular stream-playback devices. Stream Delivery Software monitors Live Stream Quality (LSQ) throughout the duration of each event to generate a LSQ score representing the quality of each stream. The LSQ score may be used as a metric to award subsequent streams to Content Delivery Network Service Providers.

Identity Security

ApNetix stores user history, including content history, securely and only on the mobile device. For security purposes, when an app is launched on a software appliance the personalization information is stored in volatile memory only and is not persistent. Users can opt-in to make their user history shareable between their ApNetix apps and they can also opt-in to give LiveGuide access to their user history.

ApNetix API

The ApNetix API functions provide communications interfaces between the following:

Mobile Manager←→Display Appliance
Mobile Manager←→Mobile App
Display Appliance←→Appliance App
Display Appliance←→Display Remote Hardware
Display Appliance←→Display Ethernet Hardware Many of these interfaces rely on embedded services to deliver a full-featured solution that allows the user to enjoy a personalized experience on his or her ApNetix-capable Television. API functions provide a common set of commands used to implement a number of operations including the following:

Navigation: Cursor movement, gestures
Selection: On screen selection
Keyboard Processing: Current keyboard input to focused text field
Search: Perform application specific search function
VCR Controls: Play, pause, rewind, fast forward
Connectivity: Network Connection & Authentication, Bluetooth Connection, Announcement, Pairing
User History: Save/Recall app history, usage history, user preferences, etc.
System: Diagnostics, Bootloader Functions, Version Information, System Capabilities, etc While the ApNetix technology delivers a major impact to facilitate a unique connectivity between a mobile device and a Television, it also has applications in delivering business presentations to an ApNetix Projector or HD Television, in delivering a desired ApNetix app to a health-club display during a workout, in connecting ApNetix Apps to an automobile display for use in navigation, music playback and the like, and in electronic signage where the ApNetix display becomes an intelligent sign platform. The applications of ApNetix technology are virtually limitless and the API will grow as new demands arise.

ApNetix Base API

The following Table includes the Basic Application Programming Interfaces which will be supported on all devices. This will be a living list that expands as new features are implemented in Software Appliances and in the Mobile Manager, however, the basic functionality will always support the ability to download an "ApNetix" App Package to one device, then to dynamic load the child "Appliance App" to an ApNetix-equipped TV or display device. These are example commands and the invention is not limited to this list.

TABLE

| | Direction | Description |
| --- | --- | --- |
| connectionEstablished Notification | Mobile → Appliance | The mobile device sends a connection established notification to the Appliance. |
| htmlApplicationLoaded Notification | Mobile → Appliance | The mobile device sends an application loaded notification to the Appliance. |
| updateMouseCursor Command | Mobile → Appliance | The mobile device sends this command to the Appliance to update the mouse cursor according to where it was on the mobile device. |
| mouseClick Command | Mobile → Appliance | The mobile device sends this command to the Appliance to click the mouse according to where it was clicked on the mobile device. |
| closeAppliance Command | Mobile → Appliance | The mobile device sends this command to the Appliance to close. |
| autoReturn Command | Mobile → Appliance | The mobile device sends this command to the Appliance to disconnect and Auto Return to the default input signal. |
| appliancePaired Notification | Mobile → Appliance | The mobile device sends a notification to the Appliance when pairing is established. |

TABLE-continued

| | Direction | Description |
|---|---|---|
| browserBack Command | Mobile → Appliance | The mobile device sends this command to the Appliance move back a page in the browser |
| browserForward Command | Mobile → Appliance | The mobile device sends this command to the Appliance to move forward a page in the browser. |
| browserZoom Command | Mobile → Appliance | The mobile device sends this command to the Appliance to zoom the browser page. |
| browserScroll Command | Mobile → Appliance | The mobile device sends this command to the Appliance to scroll the field displayed in the browser. |
| receivedCookie Command | Mobile → Appliance | The mobile device sends this command to the Appliance to update the cookies. |
| receivedDefaultURL Command | Mobile → Appliance | The mobile device sends this command to the Appliance to update the default web URL. |
| browserControlsVisible Command | Mobile → Appliance | The mobile device sends this command to the Appliance to display the browser controls. |
| updateURL Command | Mobile → Appliance | The mobile device sends this command to the Appliance to update the web URL displayed. |
| sendTextInput Command | Mobile → Appliance | The mobile device sends this command to send the text input to the Appliance. |
| addTextInput Command | Mobile → Appliance | The mobile device sends this command to add text input to the Appliance. |
| returnToHomePage Command | Mobile → Appliance | The mobile device sends this command to the Appliance to return to the home page. |
| trackPadAbsolute Command | Mobile → Appliance | The mobile device sends this command to the Appliance to select an absolute location. |
| scrollUp Command | Mobile → Appliance | The mobile device sends this command to the Appliance to scroll upward. |
| scrollDown Command | Mobile → Appliance | The mobile device sends this command to the Appliance to scroll downward. |
| tabNextInput Command | Mobile → Appliance | The mobile device sends this command to the Appliance to tab forward to the next input field. |
| tabPreviousInput Command | Mobile → Appliance | The mobile device sends this command to the Appliance to tab back to the previous input field. |
| loadApplication Command | Mobile → Appliance | The mobile device sends this command to load an Application on the Appliance. |
| pairDevice Command | Mobile → Appliance | The mobile device sends this command to pair with the Appliance. |
| processConnection Command | Appliance → Mobile | The Appliance sends this command to the mobile device when processing a connection. |
| postNewCookieToMobile Command | Appliance → Mobile | The Appliance sends this command to the mobile device to post a new cookie. |
| postTextInputField Command | Appliance → Mobile | The Appliance sends this command to the mobile device to post a text input field. |
| updateLatestURL Command | Appliance → Mobile | The Appliance sends this command to the mobile device to update the latest URL. |

ApNetix Extended API

Extended Application Programming Interfaces that may be supported include Picture-in-Picture (PIP) and video conferencing using a camera on a mobile device or an IP camera.

The Extended Application Programming Interface also extends the capabilities of Apps that are limited by design; for example, Apps that do not allow payments independent of the App may process payments on the Appliance instead.

It would be appreciated by those skilled in the art that various changes and modifications can be made to the illustrated embodiments without departing from the spirit of the present invention. All such modifications and changes are intended to be covered by the appended claims.

What is claimed is:

1. A method for permitting a user to manage a collection of applications, comprising the steps of:

providing a source computing device having an associated storage medium; the source computing device being connected to a data network;

providing an application container appliance on a target computing device having an associated storage medium; the target computing device being connected to the data network;

storing a computer-implemented database of applications including object classes, indexed by at least object class and subclass on the storage medium associated with the source computing device;

storing an associated app package on the storage medium of the source computing device; the app package being configured to be deliverable to the appliance on the target computing device connected to the data network when one application of the applications, corresponding to the app package and stored on the storage medium associated with the source computing device is selected and launched;

delivering the app package from the storage medium associated with the source computing device to the storage medium associated with the appliance on the target computing device via the data network;

installing the app package in the storage medium associated with the appliance of the target computing device;

unbundling the app package stored on the storage medium associated with appliance of the target computing device to provide a target app on the target computing device;

launching the target app on the appliance of the target computing device;

using the target app on the appliance of the target computing device; and establishing a data interface with a secure protocol between the source computing device and the target computing device.

2. The method of claim 1, further comprising the steps of:

storing and retrieving user history information related to the use of the target app, the user history information being configured for interaction with the appliance of the target computing device.

3. The method of claim 1, wherein a compatible target computing device is discoverable on the data network.

4. The method of claim 1, wherein the target computing device is a computer.

5. The method of claim 1, wherein the target computing device is a smart television.

6. The method of claim 1, wherein the target computing device is an automobile.

7. The method of claim 1, wherein the target computing device is athletic training equipment.

8. The method of claim 1, wherein the source computing device is a desktop or laptop computer.

9. The method of claim 1, wherein the source computing device is a smartphone, tablet or other mobile device.

10. The method of claim 1, wherein the data interface is between the source computing device and the target computing device is configured to prevent a device, other than the source computing device, from connecting to the target computing device.

11. A method for permitting a user to manage a collection of applications, comprising the steps of:

providing a source computing device having an associated storage medium; the source computing device been connected to a data network;

providing an application container appliance on a target computing device having an associated storage medium; the target computing device being connected to the data network;

storing a computer-implemented database of applications including object classes, indexed by at least object class and subclass on the storage medium associated with the source computing device;

storing an associated app package on the storage medium of the source computing device; the app packaeg being configured to be deliverable to the appliance on the target computing device connected to the data network when one application of the applications, corresponding to the package and stored on the storage medium associated with the source computing device is selected and launched;

delivering the app package from the storage medium associated with the source computing device to the storage medium associated with the appliance on the target computing device via the data network;

installing the app package in the storage medium associated with the appliance of the target computing device to provide a target app;

establishing a data interface with a secure protocol between the source computing device and the target computing device;

providing a software application programming interface on the target computing device for communication with and remote control of the appliance on the target device; and providing a software application programming interface on the target computing device for communication with and remote control of the target app.

12. The method of claim 11, further comprising the steps of:

storing and retrieving user history information related to the use of the target app, the user history being configured for interaction with the appliance of the target computing device.

13. The method of claim 11, wherein a compatible target computing device is discoverable on the data network.

14. The method of claim 11, wherein the target computing device is a computer.

15. The method of claim 11, wherein the target computing device is a smart television.

16. The method of claim 11, wherein the target computing device is an automobile.

17. The method of claim 11, wherein the target computing device is athletic training equipment.

18. The method of claim 11, wherein the source computing device is a desktop or laptop computer.

19. The method of claim 11, wherein the source computing device is a smartphone, tablet or other mobile device.

20. The method of claim 11, wherein the data interface between the source computing device and the target computing device is configured to prevent a device, other than the source computing device, from connecting to the target computing device.

21. The method of claim 11, further comprising the step of:
remotely controlling the target app via an appliance user interface.

22. The method of claim 11, further comprising the step of:
remotely controlling the target app by a remote control of the target computing device.

23. A method for permitting a user to manage their a collection of applications, comprising the steps of:

providing a source computing device having an associated storage medium; the source computing device being connected to a data network;

providing an application container appliance on a target computing device having an associated storage medium; the target computing device being connected to the data network;

storing a computer-implemented database of applications including object classes, indexed by at least object class and subclass on the storage medium associated with the source computing device;

storing an associated app package on the storage medium of the source computing device; the app package being configured to be deliverable to a the appliance on the target computing device connected to the data network when one application of the applications, corresponding to the app package and stored on the storage medium associated with the source computing device is selected and launched;

delivering the app package from the storage medium associated with the source computing device to the storage medium associated with the appliance on the target computing device via the data network;

installing the app package in the storage medium associated with the appliance of the target computing device;

unbundling the app package stored on the storage medium associated with appliance of the target computing device to provide a target app on the target computing device;

launching the target app on the appliance of the target computing device;

establishing a data interface between the source computing device and the target computing device for the purpose of control of the target app and for exchanging data between the target computing device and the appliance on the target computing device;

using the target app on the appliance of the target computing device; and providing a software application programming interface on the target computing device for data exchange and event triggering between the the appliance on the target computing device and the target app.

24. The method of claim 23, further comprising the steps of:
storing and retrieving user history information related to the use of the target app, the user history being configured for interaction with the appliance of the target computing device.

25. The method of claim 23, wherein a compatible target computing device is discoverable on the data network.

26. The method of claim 23, wherein the target computing device is a computer.

27. The method of claim 23, wherein the target computing device is a smart television.

28. The method of claim 23, wherein the target computing device is an automobile.

29. The method of claim 23, wherein the target computing device is athletic training equipment.

30. The method of claim 23, wherein the source computing device is a desktop or laptop computer.

31. The method of claim 23, wherein the source computing device is a smartphone, tablet or other mobile device.

32. The method of claim 23, wherein the data interface between the source computing device and the target computing device is configured to prevent a device, other than the source computing device, from connecting to the target computing device.

33. The method of claim 23, further comprising the step of:
remotely controlling the target app via an appliance user interface.

34. The method of claim 23, further comprising the step of:
remotely controlling the target app by a remote control of the target computing device.

35. A method for permitting a user to manage their a collection of applications, comprising the steps of:
providing a source computing device having an associated storage medium; the source computing device been connected to a data network;

providing an application container appliance on a target computing device having an associated storage medium; the target computing device being connected to the data network;

storing a computer-implemented database of applications including object classes, indexed by at least object class and subclass on the storage medium associated with the source computing device;

storing an associated app package on the storage medium of the source computing device; the app package being configured to be deliverable to a the appliance on the target computing device connected to the data network when the one application of the applications, corresponding to the app package and stored on the storage medium associated with the source computing device is selected and launched;

delivering the app package from the storage medium associated with the source computing device to the storage medium associated with the appliance on the target computing device via the data network;

installing the app package in the storage medium associated with the appliance of the target computing device;

unbundling the app package stored on the storage medium associated with appliance of the target computing device to provide a target app on the target computing device; and establishing a data interface using a secure protocol between the source computing device and the target computing device to lock out any other connections for the purpose of control of the target app and for exchanging data with the appliance on the target computing device and the target app.

36. The method of claim 35, further comprising the steps of:
storing and retrieving user history information related to the use of the target app, the user history being configured for interaction with the appliance of the target computing device.

37. The method of claim 35, wherein a compatible target computing device is discoverable on the data network.

38. The method of claim 35, wherein the target computing device is a computer.

39. The method of claim 35, wherein the target computing device is a smart television.

40. The method of claim 35, wherein the target computing device is an automobile.

41. The method of claim 35, wherein the target computing device is athletic training equipment.

42. The method of claim 35, wherein the source computing device is a desktop or laptop computer.

43. The method of claim 35, wherein the source computing device is a smartphone, tablet or other mobile device.

44. The method of claim 35, wherein the data interface between the source computing device and the target computing device is configured to prevent a device, other than the source computing device, from connecting to the target computing device.

45. The method of claim 35, further comprising the step of:
remotely controlling the target app via an appliance user interface.

46. The method of claim 35, further comprising the step of:
remotely controlling the target app by a remote control of the target computing device.

* * * * *